Patented June 13, 1950

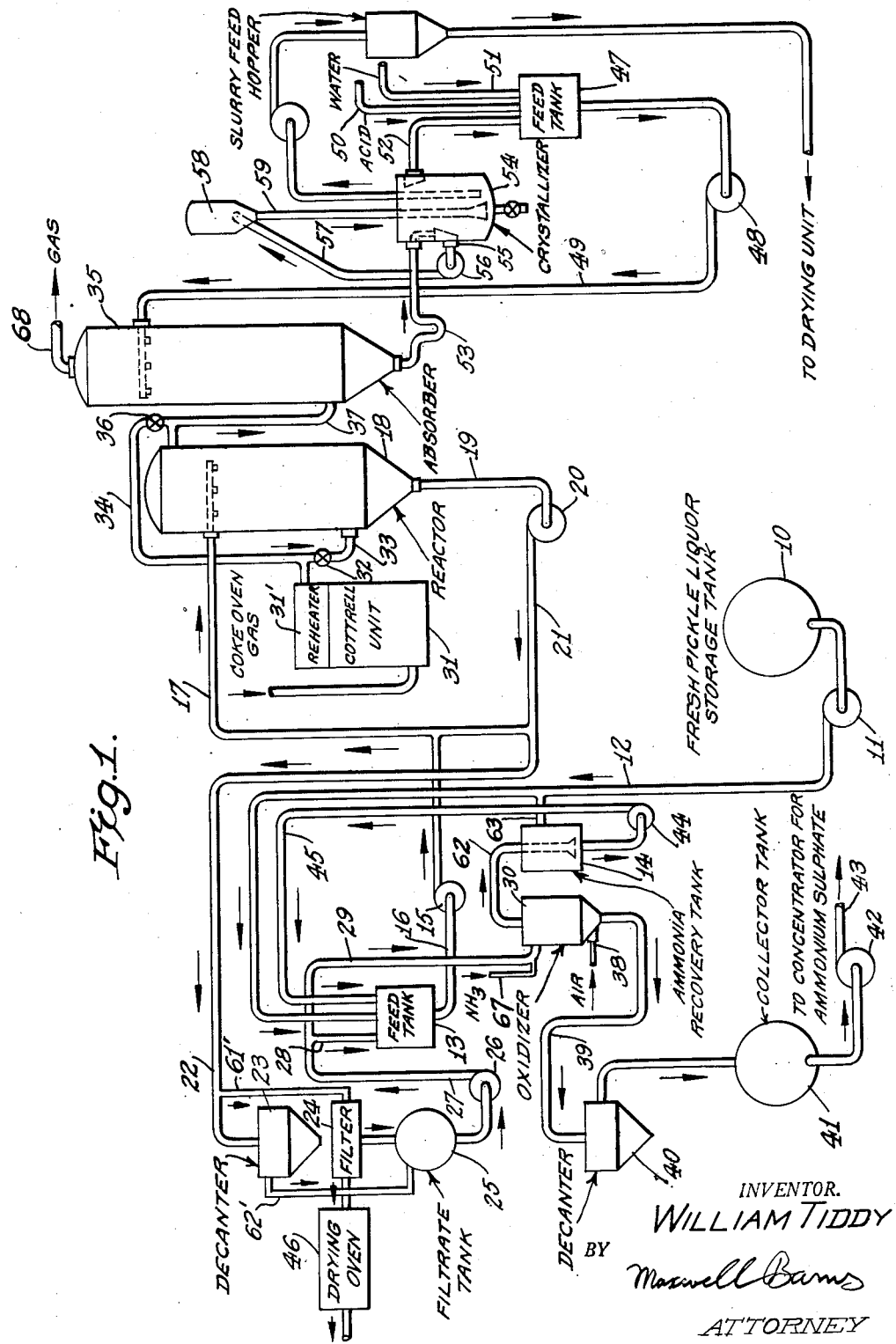

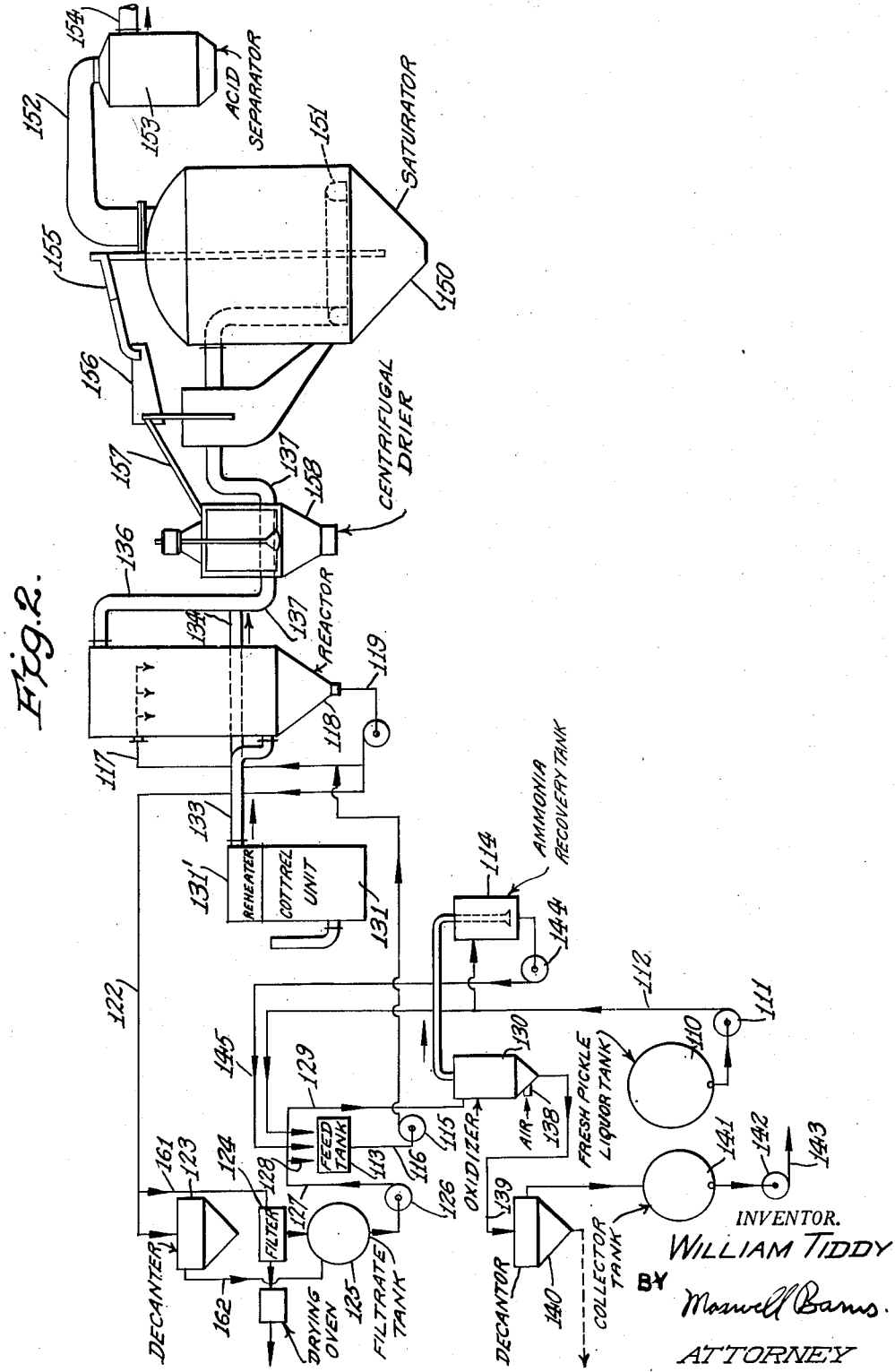

2,511,306

UNITED STATES PATENT OFFICE 2,511,306

PROCESS FOR UTILIZING COKE OVEN GAS AND WASTE PICKLE LIQUOR FOR THE PRODUCTION OF AMMONIUM SULFATE

William Tiddy, Manhasset, N. Y., assignor to Allied Chemical & Dye Corporation, a corporation of New York Application May 28, 1946, Serial No. 672,895

12 Claims. (Cl. 23—119)

This invention relates to the utilization of coke oven gas and waste pickle liquor for the production of ammonium sulfate and more particularly to the production of ammonium sulfate, the removal of ammonia and other constituents from coke oven gas and the removal of iron values from pickle liquor. Application Ser. No. 672,896, filed May 28, 1946, is copending and pertains to similar subject matter.

In the manufacturing and processing of steel, a serious waste problem exists in disposing of the pickle liquor produced in the cleaning of steel with sulfuric acid. The annual production of waste pickle liquor amounts to about 800,000,000 gallons. Even if it cannot be utilized in the production of useful products, the pickle liquor, containing as it does free sulfuric acid, presents a serious problem of disposal. In fact, many communities prohibit the disposal of this liquor in streams or rivers unless it has been previously neutralized. At the present time a great portion of the pickle liquor is normally neutralized with lime before it flows into streams or rivers.

Frequently, steel manufacturing plants are located in close proximity to coke ovens. The coke oven gas contains ammonia and while pickle liquor is available at the steel plants, it has not heretofore proved practicable to utilize such liquor commercially for recovery of ammonia from the coke oven gas. Steel manufacturers customarily resort to use of purchased sulfuric acid for recovery of ammonia from the gas. While use of relatively pure sulfuric acid is effective for ammonia recovery, it is relatively expensive and does not solve the problem of disposal of pickle liquor.

In accordance with this invention, a cyclic process is provided for recovery of ammonia from coke oven gas and removal of iron values from pickle liquor. This process may be continuous even if the amount of pickle liquor varies from time to time. By the utilization of the pickle liquor for the production of useful compounds, the problem of disposal of the pickle liquor is solved and material economies are effected.

An object of this invention is to provide a continuous process of utilizing pickle liquor for the recovery of ammonia from unpurified coke oven gas, regardless of the relative quantities of pickle liquor and coke oven gas available for use in the process.

Another object of this invention is to utilize pickle liquor and coke oven gas for the production of ammonium sulfate by a process which is flexible in operation and which is not limited by the relative available quantities of unpurified coke oven gas and pickle liquor.

In the process of this invention, unpurified coke oven gas is initially contacted intimately with a feed liquor comprising pickle liquor containing free sulfuric acid and ferrous sulfate and a liquor containing ammonium sulfate and subsequently contacted intimately with an aqueous solution of sulfuric acid. If the amount of pickle liquor available from time to time varies and is insufficient to neutralize the ammonia in the unpurified coke oven gas, a portion of the unpurified coke oven gas is contacted initially with the feed liquor and subsequently with the aqueous solution of sulfuric acid. The remaining portion of the coke oven gas is contacted solely with the aqueous solution of sulfuric acid. The relative proportions of the volume of the coke oven gas contacted with both the feed liquor and the aqueous solution of sulfuric acid and of the volume contacted solely with the aqueous solution of sulfuric acid is regulated depending upon the relative amounts of available pickle liquor and unpurified coke oven gas.

The unpurified coke oven gas, as is well known, contains ammonia, cyanides and hydrogen sulfide and is ordinarily utilized without any prior removal of the ammonia, cyanide or hydrogen sulfide, although some partial removal of one or all of these constituents may have been made prior to contact with the feed liquor. In the contact between the unpurified coke oven gas and the feed liquor, soluble ammonium sulfate and insoluble ferrous hydroxide, ferrous sulfide and ammonium ferroferrocyanide $(NH_4Fe'''Fe''(CN)_6)$ are formed. The insoluble ferrous hydroxide, ferrous sulfide and ammonium ferroferrocyanide are separated from the liquor by any suitable means, such as filtration, decantation or centrifugation. After separation of the insoluble materials, a portion of the liquor is recycled with additional pickle liquor to contact the unpurified coke oven gas. Desirably, from 60 to 90%, and preferably from 70 to 80%, of the liquor is recycled to form the feed liquor in the process.

The remaining portion of the separated liquor is oxidized by aeration, for example, to remove any residual ferrous sulfate in that portion of the clear liquor. The free ammonia content of this portion of the liquor should be in excess of that necessary to react with the sulfate radicals present to form ammonium sulfate. For this purpose, the ammonia content of this portion of the liquor is adjusted, if necessary, by addition of ammonia to the liquor prior to oxidation; thus the free ammonia content of the liquor should be at least 0.5 gram per liter, and when the ferrous sulfate content of the liquor is 2 to 4 grams per liter, the free ammonia content of the liquor should be about 0.8 gram per liter or higher. The resulting iron hydrate ($Fe_2O_3.xH_2O$) formed in the oxidation step is removed by any suitable means, such as decantation, filtration or centrifugation, and the ammonium sulfate, after such separation, is recovered from the clear liquor by any conventional means.

The ferrous sulfate content of the feed liquor after contact with the coke oven gas may fluctuate from 0 to 10 grams per liter; the contact of the coke oven gas with the feed liquor is regulated so that the liquor after contact contains not more than 10 grams of ferrous sulfate per liter and is preferably regulated so that the ferrous sulfate content of the liquor after contact with the gas is ordinarily within the range of 2 to 4 grams per liter. A concentration of at least 2 grams per liter of ferrous sulfate insures substantially that the insoluble ammonium ferroferrocyanide formed is not converted to soluble ammonium ferrocyanide. When the ferrous sulfate content of the liquor after contact with the gas is substantially 0 gram per liter, the free ammonia content of the liquor should not exceed 1.5 grams per liter in order to avoid formation of soluble ammonium ferrocyanide. The amount of ammonium sulfate in the feed liquor prior to contact with the gas is at least 100 grams per liter and is preferably at least 200 grams per liter. The ammonium sulfate content of the liquor increases during contact with the gas, the increase ordinarily being 35 to 40 grams per liter. Within limits, the concentration of the ammonium sulfate in the solution after contact with the unpurified coke oven gas may be controlled by regulating the proportion of recycled liquor to the pickle liquor forming the feed liquor. With a pickle liquor of known concentration of ferrous sulfate and sulfuric acid, this proportion can readily be determined.

The residual ammonia contained in the coke oven gas after contact with the feed liquor is removed by contact with an aqueous solution of sulfuric acid to form ammonium sulfate. The portion of the gas which is to be contacted solely with the aqueous solution of sulfuric acid may conveniently be intermixed with the coke oven gas which has been contacted with the feed liquor and the intermixed gas contacted with the aqueous solution of sulfuric acid. The ammonium sulfate formed in the aqueous solution of sulfuric acid may be recovered therefrom by any conventional means.

Desirably, in the practice of this invention, a portion of the unpurified coke oven gas is contacted with the feed liquor in a chamber and the gas, after contact with the feed liquor, is subsequently contacted with the aqueous solution of sulfuric acid. The remaining portion of the unpurified coke oven gas which is to be contacted solely with the aqueous solution of sulfuric acid may be intermixed with the gas after contact with the feed liquor and the resulting mixture is introduced into the chamber containing the aqueous solution of sulfuric acid. The relative proportion of the unpurified coke oven gas which is contacted with both the feed liquor and the aqueous solution of sulfuric acid and that which is contacted solely with the aqueous solution of sulfuric acid is regulated so that the iron values are materially reduced in the feed liquor and the ammonia in the coke oven gas is substantially completely removed. When no pickle liquor is available, all of the coke oven gas may be contacted solely with an aqueous solution of sulfuric acid so that operation of the process of the invention is independent of the amount of pickle liquor available.

A more comprehensive understanding of this invention is obtained by reference to the accompanying drawing, in which:

Fig. 1 is a diagrammatic view showing one form of apparatus for carrying out this invention, and Fig. 2 is a diagrammatic view showing another form of apparatus for the practice of this invention.

In Fig. 1 pickle liquor (which ordinarily contains from 2 to 8% of free sulfuric acid and from 10 to 22% of ferrous sulfate, but which may contain more or less of these components) is collected in a suitable tank 10 and is pumped through pump 11, through conduit 12, to a feed tank 13. As described in detail later, the pickle liquor may be intermixed in the feed tank 13 with partially neutralized pickle liquor from an ammonia recovery tank 14 and recycled liquor obtained after contact with unpurified coke oven gas. From the feed tank 13 the feed liquor which comprises the recycled liquor and fresh pickle liquor and may comprise partially neutralized pickle liquor is pumped by a pump 15 through conduits 16 and 17, to a reactor 18. The reactor 18, as well as the absorber 35, the function of which will be later described, may be any suitable equipment for effecting intimate, preferably countercurrent, contact between the coke oven gas and the feed liquor. Thus, for example, these elements may be substantially empty shells equipped at the top with a distributor for liquor and at the base with a distributor for the gas, or either or both may be towers packed with any suitable packing, e. g. refractory tile. From the reactor 18 the feed liquor is pumped through a conduit 19 by a pump 20 through conduits 21 and 22 to a decanter 23 which operates in a conventional manner to separate supernatant liquor from precipitated material. The clarified liquor flows through conduit 62' into filtrate tank 25. It will be observed that conduit 17 communicates with conduit 21; this arrangement permits feed liquor to be repeatedly recycled by pump 20 through conduits 17 and 21 and the reactor to maintain the necessary rate of flow of liquor through the reactor to effect the desired intimate contact between the gas and liquor. Liquor is fed from the reactor through conduit 22 to decanter 23 at substantially the rate at which the liquor is fed through conduit 16 to the reactor. If desired, a filter 24 into which liquor from conduit 61' enters may also be provided for effecting a more complete separation of the liquor from the precipitated material. The clear liquor is stored in a filtrate tank 25. From the filtrate tank the clear liquor is pumped by a pump 26 through a conduit 27. A portion, for example about 80%, of the total volume of the liquor passing through the conduit 27, is recycled through the reactor through a conduit 28, the outlet of the conduit 28 being directed into the feed tank 13. The remaining portion, for example about 20%, of the total volume of the liquor passing through the conduit 27 is passed through a conduit 29 to an oxidizer 30.

In the practice of the process in the apparatus illustrated in the drawing, the unpurified coke oven gas passes through a conventional Cottrell precipitator and reheater apparatus 31 and 31' prior to entering conduits 33 and 34. Reheater 31' may be utilized to reheat the gas to temperatures conventionally employed in recovery of ammonia from coke oven gas. If desired, addition of heat to the system may be accomplished by heating the feed liquor solution before entering the reactor to a temperature such that the temperature of the coke oven gas leaving the reactor is maintained at or above the temperature of the gas entering the reactor instead of by adding heat to the gas by means of reheater 31'. A portion of the gas passes through a valve 32 and conduit 33 to reactor 18. The remaining portion of the unpurified gas passes through conduits 34 and 37 to an absorber 35. As explained in detail later, the remaining portion of the gas together with the gas contacted with the feed liquor is intimately contacted with an aqueous solution of sulfuric acid in the absorber 35. The relative proportion of the unpurified coke oven gas contacted with the feed liquor in the reactor 18 and that contacted solely with the aqueous solution of sulfuric acid is regulated by the valves 32 and 36, and this proportion is changed from time to time, depending upon the amount of pickle liquor available with respect to the volume of unpurified coke oven gas to be processed. The outlet of the conduit 33 in the reactor 18 is located desirably near the bottom thereof to insure the countercurrent relationship between the coke oven gas and the feed liquor. The coke oven gas flows upwardly through the reactor 18 through conduit 37, in which it is intermixed with the unpurified coke oven gas from the conduit 34 for introduction into the absorber 35.

As heretofore described, a portion of the liquor from the conduit 27, for example about 20% of the total volume of liquor passing through the conduit 27, is directed through a conduit 29 to an oxidizer 30. Prior to the introduction of the liquor into the oxidizer 30, the ammonia content thereof is raised to preferably within the range of from .7 to 1.5 grams per liter of free ammonia. This ammonia may be introduced into the liquor through a pipe 67. The ammonia for this purpose is substantially free from cyanides and may be obtained from any suitable source such as a fixed ammonia still. The liquor in the tank 30 is oxidized by means of air provided through a pipe 38. The solution in the oxidizer is blown with sufficient air, either continuously or intermittently, to remove substantially completely any ferrous sulfate remaining in the liquor and to convert the iron values contained therein to insoluble ferric hydrate. After treatment in the oxidizer, the liquor containing the precipitated ferric hydrate is passed through a conduit 39 to a decanter 40 or filter to remove the ferric hydrate therefrom. The decanted liquor is then collected in a suitable collecting tank 41, from which it may be removed by means of a pump 42 to a conduit 43 connected to any suitable apparatus for the recovery of ammonium sulfate in crystalline form. For example, this decanted liquor containing ammonium sulfate may be mixed with liquor from feed tank 47 and introduced into absorber 35 and the ammonium sulfate content of the liquor recovered, as hereinafter described, in crystallizer 54.

To remove the small amount of ammonia evolved from the oxidizer, the air after passage through the oxidizer is brought in contact through a conduit or pipe 62 with pickle liquor in an ammonia recovery vessel 14, the pickle liquor being supplied to the vessel 14 from the conduit 12 through a conduit 63. After the pickle liquor has contacted the air containing the ammonia in the ammonia recovery tank 14, it is pumped by means of a pump 44 through a conduit 45 to the feed tank 13.

The precipitated product obtained from the filter 24 or the decanter 23 and which contains primarily iron hydrate and iron sulfide may, if desired, be converted substantially completely to iron oxide. From the decanter or filter the precipitate may be pumped to a continuous vacuum filter in which it is washed free from ammonium sulfate and subsequently delivered to a drier or heat treating oven 46. In the oven the filter cake may be heated in the presence of air. The resulting precipitate contains from 45 to 69% of iron depending upon the amount of iron hydroxide or iron oxide present. The presence of iron sulfide in the precipitate materially assists in reducing the heat required to dry or heat treat the precipitate.

The gas, after contacting the feed liquor in the reactor, passes through the conduit 37, in which it is mixed with the portion of the unpurified coke oven gas passing through the valve 36 and the conduit 34 and which by-passed the reactor 18. In the absorber 35 the gas contacts intimately an aqueous solution of sulfuric acid which flows in countercurrent relation to the gas to remove substantially completely, if desired, the residual ammonia in the gas. To insure this intimate contact, the outlet of the conduit 37 is located desirably near the bottom of the absorber 35. The gas flows upwardly through the absorber 35 and passes through an outlet 68. The conduit 37 may be provided with a preheater (not shown) to raise the temperature of the gas prior to introduction into the absorber 35.

The aqueous solution of sulfuric acid containing ammonium sulfate for contact with the gas in the absorber 35 is pumped from a feed tank 47 by a pump 48 through a conduit 49. The solution in the feed tank 47 is supplied with sulfuric acid through conduit 50, with water through conduit 51 and recycled liquor through conduit 52.

The solution, after passage through the absorber 35, flows through a conduit 53, to a crystallizing unit 54. The crystallizing unit is similar to that described in United States Patent No. 2,368,901, granted on February 6, 1945, to Semet-Solvay Engineering Corporation, as assignee of W. Tiddy. The solution passing to the crystallizer 54 is discharged adjacent to the inlet 55 of a pump 56 and is pumped through the conduit 57 to an evaporative cooling chamber 58. By means of a barometric condenser (not shown) the evaporative cooling chamber 58 is maintained under relatively low pressure, and the solution contained in the evaporative cooling chamber 58 is cooled and concentrated by evaporation of water sufficiently to supersaturate the solution of ammonium sulfate. The supersaturated solution passes through the conduit 59 to the bottom of the crystallizer 54. The supersaturated solution of ammonium sulfate passes upwardly in crystallizer 54 over a suspension of ammonium sulfate crystals, causing the crystals to grow. As the crystals grow to the desired size, they fall to the bottom of the crystallizer and are removed continuously or from time to time. A solution containing from 44 to 46% of ammonium sulfate and substantially free from crystalline ammonium sulfate passes from the crystallizer 54 through the conduit 52 to be recycled through the absorber with sulfuric acid and water. Desirably, sufficient sulfuric acid and water are added to the feed tank through conduits 50 and 51 respectively to insure a concentration of ammonium sulfate between 40 to 45% by weight and a sulfuric acid concentration within the range of 10 to 50 grams per liter. The solution which is supplied to the absorber 35 should preferably be from 35° to 65° C.

In the apparatus shown in Fig. 1, a portion of the coke oven gas passes from the Cottrell unit 31, through the conduit 33 to the reactor 18. In the reactor 18, it is contacted with feed liquor comprising pickle liquor containing ferrous sulfate and free sulfuric acid and a recycled liquor containing ammonium sulfate. The feed liquor which is a mixture of recycled liquor and pickle liquor and which may contain a maximum of 100 grams of ferrous sulfate and 50 grams, and desirably not more than 25 grams, of sulfuric acid per liter, and preferably contains at least 20 grams of ferrous sulfate and at least .2 gram of sulfuric acid per liter, passes in countercurrent relation with the gas, and intimately contacts the gas in the reactor 18. The composition of the feed liquor is so controlled that the amount of sulfate radicals in the feed liquor is approximately equivalent to the desired amount of sulfate radicals in the recycled liquor and the feed liquor is ordinarily so controlled that it contains sulfate radicals equivalent to more than 100, preferably more than 200, grams of ammonium sulfate per liter of recycled liquor. Desirably, the rate of flow of feed liquor and the unpurified coke oven gas to the reactor 18 is such that from 75 to 95% of the iron values contained in the feed liquor are converted to insoluble compounds. This can be achieved by regulating the volume of unpurified coke oven gases which are diverted to the reactor 18 by adjustment of the valve 32. In the reactor, the ammonia, hydrogen sulfide and cyanogen compounds present in the coke oven gas react with the ferrous sulfate and sulfuric acid in the feed liquor to produce insoluble iron sulfide and hydrate, insoluble cyanide compounds, and soluble ammonium sulfate. The contact time of the feed liquor with the gas in the reactor 18 is controlled so that the solution withdrawn from the reactor 18 through the conduit 19 has no soluble ammonium ferrocyanides and from 0 to 10, and preferably from 3 to 4 grams, of ferrous sulfate per liter.

The solution leaving the reactor at normal gas temperatures is pumped by means of a pump 20 to a decanter 23, and the solution may, if desired, be filtered through the filter 24 to assure substantially complete removal of the precipitated iron compounds. The supernatant liquid from the filtration is stored in a filtrate tank 25 and is recycled and blended with raw pickle liquor in the feed tank 13 to produce a feed liquor of such concentration that (1) the resulting feed liquor contains at least 100 grams of ammonium sulfate per liter and preferably at least 200 grams of ammonium sulfate per liter, and (2) the volume and consistency of the precipitated iron hydrate and iron sulfide is controlled so that no blocking or high pressure differential exists in the reactor 18.

The liquid withdrawn from the tank 25 which is not recycled and which ordinarily comprises a minor portion, for example about 20% of the liquor, is subjected to oxidation conditions to convert the remaining ferrous sulfate to insoluble iron hydrate by passage through the oxidizer 30. The ammonia content of the solution leaving the reactor 18 desirably varies from 0.1 to 1.0 gram per liter. If necessary, therefore, prior to passage through the oxidizer 30, the ammonia content of the supernatant liquid is increased to contain at least 0.5 gram per liter of free ammonia. The primary purpose of the oxidizer is to eliminate the remaining ferrous sulfate in the solution leaving the reactor 18 so that ammonium sulfate substantially free from iron can be obtained in the crystallization step. The reaction which takes place is among free ammonia, oxygen and ferrous sulfate at atmospheric temperatures. The ferrous sulfate is oxidized and the ammonia precipitates as ferric hydroxide, while the sulfate radical is converted to ammonium sulfate. Substantially complete removal of the ferrous sulfate is effected when the ammonia in the feed liquor contains or is strengthened to 0.8 gram per liter and the original solution fed to the oxidizer contains from 3 to 4 grams per liter of ferrous sulfate. The solution in the oxidizer is blown with air, after which substantially no ferrous sulfate exists in the solution and all of the iron has been converted to insoluble iron hydrate. The liquor containing the precipitated iron hydrate is transferred to a decanter 40 and the iron hydrate removed from the liquor. The clear liquor is then collected in a tank 41 from which the ammonium sulfate may be recovered by any well known means. If desired, a filter may be installed between the oxidizer 30 and the decanter 40 or between the decanter 40 and collector tank 41 to remove any suspended iron hydrate carried in the supernatant liquor.

To recover the small amount of unused ammonia from the oxidizer 30, the air released from the oxidizer is contacted with fresh pickle liquor in the ammonia recovery tank 14, and the free sulfuric acid in the pickle liquor readily absorbs this ammonia. The pickle liquor, after absorption of the ammonia, passes to the feed tank 13.

The oxidation step may be omitted, if the presence of a small amount of iron in the ammonium sulfate recovered by the method is not objectionable. In that procedure, the separated liquor passing through the pipe 29 is directly processed to recover the ammonium sulfate from it by any conventional means, such as evaporation. However, substantially iron-free ammonium sulfate is ordinarily required, and the method desirably includes the oxidation step.

The remaining portion of the unpurified coke oven gas from the Cottrell unit 31 which is not diverted through the reactor 18, passes through the absorber 35 and is intimately contacted therein with an aqueous solution of sulfuric acid which also contains ammonium sulfate. In the absorber, the residual ammonia contained in the coke oven gas is removed substantially completely. The ammonium sulfate which is formed is recovered in the crystallizer 54. When a large amount of pickle liquor is available, all or the greater portion of the unpurified coke oven gas can be circulated through the reactor 18. However, when there is substantially little pickle liquor available, only a portion of the coke oven gas would be circulated through the reactor 18. In fact, at times if there is no pickle liquor available, the coke oven gas may by-pass the reactor entirely by the operation of valve 32.

The rates of flow of the coke oven gas and pickle liquor together with other data of a typical run in the reactor shown in Figs. 1 and 2 are as follows:

| | |
|---|---:|
| Gas rate of coke oven gas—cu. ft. per hour | 10,000 |
| NH₃ content of gas—lb. per 10,000 cu. ft. | 6 |
| Pickle liquor used: | |
| Composition: | |
| FeSO₄, per cent | 16.7 |
| H₂SO₄, per cent | 8.5 |
| Volume per hour, per cent of feed to reactor | 23.5 |
| (Remaining 75–80% is recycled liquor.) | |
| Feed to reactor: | |
| Composition: | |
| FeSO₄, g. p. l | 49.0 |
| H₂SO₄, g. p. l | 25.0 |
| Rate, gallons per hour | 33.1 |
| Feed to thickener or decanter, gal. per hour | 33.1 |
| Volume of filtrate plus clarified liquor from decanter or thickener plus water washing of cake, gal. per hour | 35.6 |
| Volume returned to system for blending with fresh pickle liquor, gal. per hour | 25.3 |
| Volume to oxidizer, gal. per hour | 10.3 |
| Volume to collector tank for ammonium sulfate recovery unit, gal. per hour | 10.3 |
| Composition, g. p. l. (NH₄)₂SO₄ | 300 |
| Filter cake produced from filtration of thickened slurry from decanter, pounds | 29.9 |
| Composition of wet washed cake (dry basis): | |
| FeS, per cent | 89 |
| Insoluble ammonium ferroferrocyanide, per cent | 7 |
| Iron hydrate, per cent | 4 |
| Moisture content of filter cake, per cent | 65 |
| Weight of cake dried at 105° C., pounds | 8.6 |
| Ammonia recovery, per cent | 90 |

In Fig. 2 there is illustrated a modification of the apparatus shown in Fig. 1. Instead of the scrubber operation in conjunction with a crystallizer for contacting the gas with the aqueous solution of sulfuric acid and the recovery of amonium sulfate, the system shown in Fig. 2 includes a standard ammonium sulfate saturator. The apparatus employed for contacting the gas with the blended feed liquor including the pickle liquor, however, is identical with that shown in Fig. 1.

In Fig. 2, pickle liquor is collected in a suitable tank 110 and is pumped through a conduit 112 by a pump 111 to a feed tank 113. From the feed tank 113 the feed liquor comprising recycled liquor and fresh pickle liquor is pumped by pump 115 through conduits 116 and 117 to a reactor 118. From the reactor 118 the feed liquor is pumped through conduits 119 and 122 to a decanter 123. A filter 124 into which feed liquor from conduit 161 enters may also be employed to effect a more complete separation of the liquor from the precipitated material. The clear liquor is stored in a filtrate tank 125. From the filtrate tank the clear liquor is pumped by a pump 126 through a conduit 127. A portion of the total volume of liquor passing through conduit 127 is recycled through conduit 128 to the feed tank 113. The remaining portion of the clear liquor passes through a conduit 129 to an oxidizer 130.

A portion of the unpurified coke oven gas passes from the Cottrell precipitator and reheater unit 131, 131' to the reactor 118 through the conduit 133 and flows therein in countercurrent relation with the flow of the feed liquor. The remaining portion of the unpurified coke oven gas passes through conduits 134 and 137 to a saturator 150. A preheater (not shown) may be provided in the conduit 137, to insure that the temperature of the gas introduced into the saturator is sufficiently high to effect evaporation of water at an adequate rate in the saturator. The portion of the coke oven gas after passage through the reactor 118 flows through the conduit 136 to be intermixed in the conduit 137 with the unpurified coke oven gas which by-passed the reactor. Suitable valves are provided in the conduits 133 and 134 to regulate the relative proportion of unpurified coke oven gas which passes through the reactor 118 and that which by-passes the reactor 118.

The ammonia content of the portion of the feed liquor which passes to the oxidizer 130 is preferably raised to within the range of from .7 to 1.5 grams per liter of free ammonia. The liquor in the tank 130 is oxidized by means of air provided through pipe 138. After treatment in the oxidizer, the liquor containing precipitated ferric hydrate is passed through conduit 139 to a decanter 140. The decanted liquor is collected in a suitable tank 141 from which it is removed as desired by means of pump 142 through a conduit 143 connected to any suitable apparatus for the recovery of ammonium sulfate.

The ammonia contained in the air, after passage through the oxidizer, is contacted with pickle liquor in ammonia recovery vessel 114, and the resulting liquor is pumped through conduit 145 by pump 144 to be added to the liquor contained in feed tank 113.

The gas, after contact with the feed liquor in the reactor, is intermixed with the unpurified coke oven gas which by-passes the reactor in the conduit 137 and the mixed gas is contacted with an aqueous solution of sulfuric acid in the saturator 150. The saturator 150 may be provided with a gas inlet 151 in the form of a perforated ring. After contact with the aqueous solution of sulfuric acid in the saturator 150, the gas passes through conduit 152 to an acid separator 153 to remove any entrained sulfuric acid, and thence through an outlet 154 in the acid separator 153, to the final cooler. In the saturator 150 the residual ammonia in the coke oven gas is substantially completely removed.

The ammonium sulfate formed as a result of the interaction between the ammonia and sulfuric acid in the saturator may be conveniently recovered by passing the crystals of ammonium sulfate with the supersaturated solution thereof through the conduit 155 to a drain table 156 and conveying the resulting crystals through a conveyor 157 to a centrifugal drier 158.

One important difference in the reaction occurring in the saturator shown in Fig. 2 from the scrubber-crystallizer system illustrated in Fig. 1 is that an increase from 5 to 10° C. in the temperature of the gas introduced into the saturator or preheating the solution before entering the saturator is necessary to make up the deficiency of heat required for the evaporation of water introduced into the saturator. This heat loss is due primarily to the lower ammonia content of the gas entering the saturator, which reduces the amount of heat developed in the reaction between ammonia and sulfuric acid.

With commercial equipment there are two advantages in the practice of this invention involved in the utilization of the apparatus shown in Fig. 1 over that illustrated in Fig. 2. These advantages are: (1) easier control of operation of the absorber and crystallizer than that experienced with the use of the saturator, and (2) there is a much lower differential in the absorber shown in Fig. 1 than in the saturator illustrated in Fig. 2. With typical commercial apparatus this differential is 3" of water in the apparatus shown in Fig. 1 and 25" of water in the system illustrated in Fig. 2. This advantage is an appreciable one in terms of tons of ammonium sulfate produced, since 100% of the gas in all cases passes through the absorber or saturator, whereas 100% of the ammonia does not pass through the saturator or the absorber. Further, carrying out the process as hereinabove disclosed in connection with Fig. 1 results in production of substantially uniform ammonium sulfate crystals as compared with those produced by the process of Fig. 2.

It will be obvious from the above description that various changes may be made without departing from the scope of the invention. Thus, for example, while for the purpose of economy I prefer to blend recycled liquor containing ammonium sulfate with the pickle liquor to form the feed liquor employed in the process, the pickle liquor may be blended with ammonium sulfate solution from other sources to form the feed liquor. Further, the liquor from the reactor (after separation of precipitate) may be continuously introduced both into the feed tank and oxidizer, or may be alternately fed to the tank and oxidizer for time periods such that the desired proportions of the liquor are recycled and oxidized. Blending of the pickle liquor and recycled liquor may be accomplished in the presence of the coke oven gas, for example, by separately spraying the liquors into the top of the reactor. Ammonia from any desired source, e. g. the conventional ammonia still, may be utilized at any point in the process, for example, such ammonia may be mixed with the coke oven gas before it enters the reactor, or may be introduced into the feed tank to neutralize partially the pickle liquor before entry of the liquor into the reactor.

As hereinabove described, contact between the coke oven gas and the liquor is preferably effected in countercurrent manner in suitable towers. However, the gas may be intimately contacted with the liquor in other types of apparatus, for example, the gas may be passed through a saturator-type chamber containing a body of pickle liquor diluted with recycled liquor containing ammonium sulfate while maintaining the precipitate suspended in the liquor by agitation. Recycled liquor and pickle liquor may be added to the saturator as required and reacted liquor drawn off and filtered or decanted for oxidation and recycling to the chambers.

In carrying out the invention, it is important that the coke oven gas contain hydrogen sulfide and ammonia, but it is not essential that other constituents which are capable of being removed by conventional coke oven gas purification processes be present in the gas. Further, other inert gases containing ammonia and hydrogen sulfide may be utilized in accordance with the invention. The gas may be contacted with the feed liquor at temperatures ordinarily employed in conventional processes for recovery of ammonia from coke oven gas, for example, from 35° to 70° C.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A cyclic process for producing ammonium sulfate comprising contacting unpurified coke oven gas with a feed liquor comprising a mixture of pickle liquor containing ferrous sulfate and free sulfuric acid and a recycled liquor containing ammonium sulfate, thereby removing a portion of the ammonia from the gas, separating the liquor from the resulting precipitate formed, recycling a portion of the separated liquor for blending with the pickle liquor to form said feed liquor for contact with the unpurified coke oven gas, passing an oxygen-containing gas through the remainder of said separated liquor in the presence of free ammonia, whereby substantially all of the iron sulfate in said liquor is reacted to form ammonium sulfate and the iron values are converted to iron hydrate, separating the iron hydrate from the resulting ammonium sulfate solution, and scrubbing coke oven gas which has passed out of contact with said feed liquor with an aqueous solution of sulfuric acid containing said last-named ammonium sulfate solution for removal of the remainder of the ammonia from said gas.

2. A cyclic process for producing ammonium sulfate comprising contacting unpurified coke oven gas with a feed liquor comprising a mixture of pickle liquor containing ferrous sulfate and free sulfuric acid and a recycled liquor containing ammonium sulfate, separating the liquor from the resulting precipitate formed, recycling from 60% to 90% of the separated liquor for blending with pickle liquor to form said feed liquor for contact with the unpurified coke oven gas and contacting the coke oven gas with an aqueous solution of sulfuric acid whereby the residual ammonia contained in said coke oven gas is substantially removed.

3. A cyclic process for producing ammonium sulfate comprising passing unpurified coke oven gas successively through a first chamber and a second chamber, passing a feed liquor comprising a mixture of pickle liquor containing ferrous sulfate and free sulfuric acid and recycled liquor containing ammonium sulfate through said first chamber in intimate contact with said coke oven gas, whereby the iron values contained in said feed liquor are materially reduced, and passing an aqueous solution of sulfuric acid through said second chamber in intimate contact with the coke oven gas whereby the residual ammonia in the coke oven gas is substantially completely removed.

4. A cyclic process for producing ammonium sulfate comprising passing unpurified coke oven gas through a plurality of chambers in sequence, passing through one of said chambers a feed liquor comprising a mixture of pickle liquor and recycled liquor containing ammonium sulfate and passing an aqueous solution of sulfuric acid through another of said chambers in countercurrent relation to the coke oven gas whereby the ammonia in the coke oven gas initially reacts with the iron salts in the feed liquor, and the residual ammonia in the coke oven gas, after the initial reaction, is removed substantially completely by reaction primarily with the aqueous solution of sulfuric acid, separating the liquor from the precipitated iron compounds formed by contact of the gas with the feed liquor and recycling a portion of the resulting clear liquor for blending with the pickle liquor to form said feed liquor.

5. A process for the recovery of ammonia as ammonium sulfate from gas containing ammonia and hydrogen sulfide, which comprises intimately contacting the gas with pickle liquor containing free sulfuric acid and iron sulfate, whereby the major portion of the iron in the pickle liquor is precipitated and the ammonia in the gas reacts with the sulfate radicals of the liquor to form ammonium sulfate, withdrawing liquor from the zone of contact, separating withdrawn liquor containing dissolved ammonium sulfate and ferrous sulfate from the precipitate, oxidizing separated liquor with air in the presence of free ammonia to form additional ammonium sulfate and intimately contacting the resulting gas with an aqueous solution of sulfuric acid substantially free of iron values whereby the residual ammonia contained in said gas is substantially removed to form ammonium sulfate.

6. A cyclic process for recovering ammonia from unpurified coke oven gas containing ammonia, hydrogen sulfide and cyanogen compounds and recovery of iron values from pickle liquor containing free sulfuric acid and ferrous sulfate, which comprises blending pickle liquor containing free sulfuric acid and ferrous sulfate with recycled liquor containing ammonium sulfate to produce feed liquor containing from .2 to 50 grams of free sulfuric acid, from 20 to 100 grams of ferrous sulfate and at least 100 grams of ammonium sulfate per liter of the feed liquor, passing said unpurified coke oven gas through reactor and absorber chambers in sequence, passing said feed liquor through the reactor chamber in countercurrent relation to the coke oven gas, and an aqueous solution of sulfuric acid through the absorber in countercurrent relation to the coke oven gas, whereby hydrogen sulfide and cyanogen compounds and a portion of the ammonia present in the coke oven gas react with the iron salt in the feed liquor to form ammonium sulfate and to precipitate iron hydrate, iron sulfide and ammonium ferroferrocyanide and the residual ammonia present in the coke oven gas is removed substantially completely by reaction in the absorber chamber with the sulfuric acid passing therethrough, regulating the flow of feed liquor through said reactor chamber so that the ferrous sulfate content of the liquor leaving said reactor chamber does not exceed 10 grams per liter and the free ammonia content of the liquor leaving the reactor chamber falls within the range of .1 to 1 gram per liter, separating the precipitate from the liquor leaving the reactor chamber, recycling from 60% to 90% of the separated liquor to the reactor chamber with pickle liquor for contact with additional coke oven gas, passing an oxygen-containing gas through the remainder of said separated liquor in the presence of at least .5 gram per liter of free ammonia, whereby substantially all of the sulfate radical in said oxidized liquor is reacted to form ammonium sulfate and the iron values in the liquor are converted to iron hydrate, and separating the iron hydrate from the resultant ammonium sulfate solution.

7. A process as defined in claim 6 in which the ferrous sulfate content of the liquor leaving the reactor chamber is substantially maintained within the range of from 2 to 4 grams per liter and the ammonium sulfate content of the liquor introduced into the reactor chamber is at least 200 grams per liter.

8. A process for recovery of ammonia as ammonium sulfate from gases containing ammonia and hydrogen sulfide and recovery of iron values from pickle liquor containing ferrous sulfate, which comprises forming a feed liquor containing at least 100 grams of ammonium sulfate, not more than 25 grams of free sulfuric acid, and from 20 to 100 grams of ferrous sulfate per liter, by blending ammonium sulfate solution with pickle liquor containing ferrous sulfate, intimately contacting said feed liquor with said gas, whereby iron values of said liquor are precipitated as iron hydrate and iron sulfide, separating the precipitate from the liquor, recycling a portion of the separated liquor together with pickle liquor into intimate contact with additional gas containing ammonia and hydrogen sulfide, oxidizing the remainder of said liquor in the presence of free ammonia, and intimately contacting the resulting gas with an aqueous solution of sulfuric acid substantially free of iron values whereby the residual ammonia contained in said gas is substantially removed to form ammonium sulfate.

9. A cyclic process for the recovery of ammonium sulfate from unpurified coke oven gas, which comprises dividing the unpurified coke oven gas into two portions, contacting one portion of said coke oven gas successively with a blended pickle liquor containing free sulfuric acid, ferrous sulfate and recycled liquor containing ammonium sulfate, and with an aqueous solution of sulfuric acid substantially free of iron, contacting the second portion of said coke oven gas directly with said aqueous solution of sulfuric acid and regulating the relative proportion of the unpurified coke oven gas which is contacted with both the blended pickle liquor and the aqueous solution of sulfuric acid and that which is contacted directly with the aqueous solution of sulfuric acid so that a material amount of the iron values in the blended pickle liquor is precipitated out and the ammonia in the coke oven gas is substantially completely removed.

10. A cyclic process for recovery of ammonia as ammonium sulfate from gases containing ammonia and hydrogen sulfide, which comprises intimately contacting the gas with feed liquor comprising a mixture of pickle liquor containing free sulfuric acid and iron sulfate and recycled liquor containing ammonium sulfate, whereby iron in the feed liquor is precipitated and a portion of the ammonia in the gas reacts with sulfate radicals of the liquor to form ammonium sulfate, separating liquor containing dissolved ammonium sulfate from the precipitate, recycling a portion of the separated liquor with additional pickle liquor into contact with additional coke oven gas, and passing said coke oven gas after it passes out of contact with said feed liquor into contact with an aqueous solution of sulfuric acid for removal of the remainder of the ammonia from said gas.

11. A cyclic process for recovery of ammonia as ammonium sulfate from gases containing ammonia and hydrogen sulfide, which comprises intimately contacting the gas with feed liquor comprising pickle liquor containing free sulfuric acid and recycled liquor containing ammonium sulfate, whereby iron in the feed liquor is precipitated and a portion of ammonia in the gas reacts with sulfate radicals of the liquor to form ammonium sulfate, separating liquor containing dissolved ammonium sulfate from the precipitate, recycling a portion of the separated liquor with additional pickle liquor into contact with additional coke oven gas, passing an oxygen-containing gas through the remainder of said separated liquor in the presence of free ammonia, whereby substantially all of the iron sulfate in said liquor is reacted to form ammonium sulfate and the iron values are converted to iron hydrate, separating the iron hydrate from the resultant ammonium sulfate solution, and scrubbing coke oven gas which has passed out of contact with said feed liquor with an aqueous solution of sulfuric acid containing said last-named ammonium sulfate solution for removal of the remainder of the ammonia from said gas.

12. A process for recovery of ammonia as ammonium sulfate from gases containing ammonia and hydrogen sulfide and recovery of iron values from pickle liquor containing ferrous sulfate, which comprises forming a feed liquor containing at least 100 grams of ammonium sulfate, not more than 25 grams of free sulfuric acid, and from 20 to 100 grams of ferrous sulfate per liter, by blending ammonium sulfate solution with ferrous sulfate derived from pickle liquor, intimately contacting said feed liquor with said gas, whereby iron values of said liquor are precipitated as iron hydrate and iron sulfide, separating the precipitate from the liquor, recycling a portion of the separated liquor together with ferrous sulfate derived from pickle liquor into intimate contact with additional gas containing ammonia and hydrogen sulfide, oxidizing the remainder of said liquor in the presence of free ammonia, and intimately contacting the resulting gas with an aqueous solution of sulfuric acid substantially free of iron values whereby the residual ammonia contained in said gas is substantially removed to form ammonium sulfate.

WILLIAM TIDDY.

REFERENCES CITED

The following references are of record in the file of this patent:

UNITED STATES PATENTS

| Number | Name | Date |
|---|---|---|
| 1,983,320 | Sperr | Dec. 4, 1934 |
| 1,986,900 | Sperr | Jan. 8, 1935 |
| 2,368,901 | Tiddy | Feb. 6, 1945 |

Certificate of Correction

Patent No. 2,511,306 June 13, 1950

WILLIAM TIDDY

It is hereby certified that error appears in the printed specification of the above numbered patent requiring correction as follows:

Column 5, line 58, for "preciiptated" read *precipitated*; column 9, line 62, after the numeral and period "123." insert the following sentence: *The supernatant liquor then passes through conduit 162 into filtrate tank 125.*;

and that the said Letters Patent should be read as corrected above, so that the same may conform to the record of the case in the Patent Office.

Signed and sealed this 14th day of November, A. D. 1950.

[SEAL]

THOMAS F. MURPHY,
*Assistant Commissioner of Patents.*